US011544680B2

(12) United States Patent
Koski et al.

(10) Patent No.: US 11,544,680 B2
(45) Date of Patent: Jan. 3, 2023

(54) VEHICLE PRIORITY-BASED COMPENSATION SYSTEM

(71) Applicant: CoKo Tech, LLC, Albuquerque, NM (US)

(72) Inventors: Christine Koski, Dallas, TX (US); Stephen Charles Cook, Albuquerque, NM (US)

(73) Assignee: COKO TECH, LLC, Albuquerque, NM (US)

( * ) Notice: Subject to any disclaimer, the term of this patent is extended or adjusted under 35 U.S.C. 154(b) by 452 days.

(21) Appl. No.: 16/702,062

(22) Filed: Dec. 3, 2019

(65) Prior Publication Data

US 2021/0166209 A1 Jun. 3, 2021

(51) Int. Cl.
*G06Q 40/00* (2012.01)
*G06Q 20/10* (2012.01)
*G05D 1/02* (2020.01)
*H04W 4/46* (2018.01)

(52) U.S. Cl.
CPC ......... *G06Q 20/105* (2013.01); *G05D 1/0287* (2013.01); *H04W 4/46* (2018.02)

(58) Field of Classification Search
CPC .......................... G05D 1/0293; G05D 1/0088
See application file for complete search history.

(56) References Cited

U.S. PATENT DOCUMENTS 8,751,391 B2 6/2014 Freund
10,768,637 B2 * 9/2020 He ........................ G05D 1/0088
2009/0289113 A1 11/2009 Vilnai et al.

* cited by examiner

*Primary Examiner* — Ojo O Oyebisi
(74) *Attorney, Agent, or Firm* — Fish IP Law, LLP (57) ABSTRACT

In a method for managing compensatory transactions between vehicles, a compensation engine determines relative priorities of the first and second vehicles. The compensation engine determines compensation between the first and second vehicles based on the relative priorities of the first and second vehicles. Following the determination of compensation, the compensation engine executes a transfer of compensation between the first and second vehicles.

5 Claims, 4 Drawing Sheets

VEHICLE PRIORITY-BASED COMPENSATION SYSTEM

FIELD OF THE INVENTION

The field of the invention is vehicle management systems.

BACKGROUND

Given the increase in driver-independent vehicle aids being implemented in vehicles and driverless vehicles being developed and used in real world circumstances, establishing communication between vehicles is vital in creating a robust system that can accommodate to changing variables. Importantly, establishing communication between vehicles such that the one or more vehicles in communication change their respective behaviors based on the vehicles around them greatly enhances, broadens, and deepens the utility of driverless vehicles. With enhanced inter-vehicle communication and corresponding flexibility in vehicle behavior, a robust compensation system allows for more flexibility in how vehicles interact with each other.

In conventional compensation systems associated with vehicles, vehicles simply react to their surroundings in static ways to provide compensation for travel privileges, including, for example, the payment of a toll to access a priority lane. Additionally, conventional systems contemplate the payment of a fee for prioritized travel without considering significantly more complex inter-vehicle transfers of compensation made possible by technologies associated with both driverless and non-driverless vehicles. In one example, conventional vehicle-based compensation systems can have a near field communications system that allows a sensor to detect a vehicle entering a prioritized lane. In other examples, vehicle-based compensation systems can track vehicles by using a camera with character recognition to identify a license plate number. These conventional compensation systems are limited to detecting the presence of vehicles within a limited environment to engage in a one-way financial transaction, including, for example, the payment of a toll to access a priority lane.

In contrast, the increasing connectivity of vehicles to larger systems and each other allows for more complex systems with less rigid boundaries. As a result, the state of art can be improved by providing a compensation system that is able to scale to the additional logistical requirements resulting from interconnected vehicles (e.g., network-connected cars, planes, and boats). Compensation systems that allow for vehicles to conduct multiple transactions with each other for any type of financial transaction can significantly enhance the capabilities of interconnected vehicles. For example, a compensation system that enables five cars to complete substantially simultaneous transactions guided by a set of parameters with each other can allow for the five cars to establish different tiers of cruising speeds on a highway regardless of the presence of a formal infrastructure (e.g., a conventional toll payment system).

U.S. Pat. No. 8,751,391 to Freund teaches a method and a process that allows consumers to make financial payments to a third party using RFID technology. Freund does not contemplate completing financial transaction between or among vehicles. Additionally, Freund contemplated only using RFID technology to execute financial transactions and other types of transactions. As such, Freund is limited in its application, and does not contemplate the allowing complex inter-vehicle compensation to occur based on changing compensation parameters associated with different vehicles.

US Patent Application Publication Number 20090289113 to Vilnai teaches management system of allowing a vehicle to communicate with a station relay unit to either complete a financial transaction or receive authorization. Similarly to Freund, Vilnai does not disclose a vehicle to vehicle compensation system and the inventive concept of Vilnai behaves similarly to conventional toll readers. As such, Vilnai is also limited in its application, and does not contemplate the allowing complex inter-vehicle compensation to occur based on changing compensation parameters associated with different vehicles.

Freund, Vilnai, and all other extrinsic materials discussed herein are incorporated by reference to the same extent as if each individual extrinsic material was specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for systems to allow network-connected vehicles to participate in a compensation system allowing wide flexibility in compensation options to enable sophisticated transactions.

SUMMARY OF THE INVENTION

Network-connected vehicles allow for significantly more complex financial transactions to occur between vehicles that allow the establishment of a hierarchy of vehicles based on their respective permissions. For example, both establishing different tiers of cruising speeds on a highway based on how much a driver is willing to pay for the privilege, and transferring compensation to drivers willing to forgo or give up travel privileges, are possible if inter-vehicle communication and control are implemented.

A vehicle compensation system allows compensatory transaction to be executed between multiple vehicles based on their relative priorities.

Among other things, the inventive subject matter provides apparatus, systems, and methods in which the vehicle compensation system identifies vehicles within designated parameters and establishes communications between or among multiple vehicles. Once communication is established, the inventive subject matter determines the priority of a designated vehicle relative to the surrounding vehicles. Based on the priority established, the vehicle management system executing of the one or more compensatory transactions between the vehicles.

Various resources, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to a computer-based scheduling system, various alternative configurations are also deemed suitable and may employ various computing devices including servers, interfaces, systems, databases, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclose apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including facilitating the movement of driverless and non-driverless vehicles, establishing priorities/precedence among multiple vehicles, and allowing communication between vehicles.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
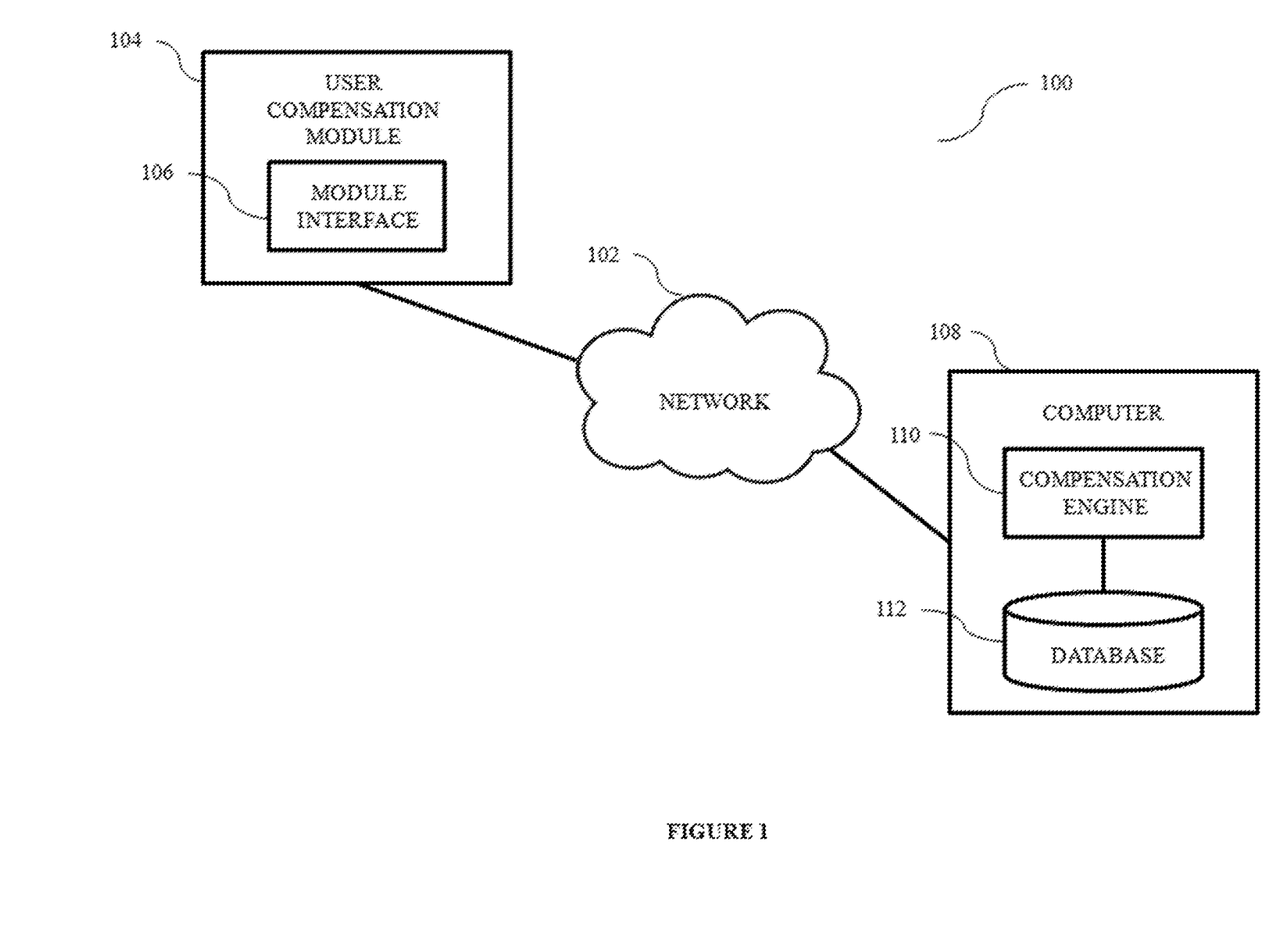
FIG. 1 is a functional block diagram illustrating a distributed data processing environment.

FIG. 1 is a functional block diagram illustrating a distributed data processing environment.

The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes compensation module 104 and server computer 108, interconnected over network 102. Network 102 can include, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between compensation module 104, server computer 108, and any other computing devices (not shown) within distributed data processing environment 100.

It is contemplated that compensation module 104 can be any programmable electronic computing device capable of communicating with various components and devices within distributed data processing environment 100, via network 102. It is further contemplated that compensation module 104 can execute machine readable program instructions and communicate with any devices capable of communication wirelessly and/or through a wired connection. Compensation module 104 includes an instance of module interface 106.

Module interface 106 provides a user interface to compensation engine 110. Preferably, module interface 106 comprises a graphical user interface (GUI) or a web user interface (WUI) that can display one or more of text, documents, web browser windows, user option, application interfaces, and operational instructions. It is also contemplated that user interface can include information, such as, for example, graphics, texts, and sounds that a program presents to a user and the control sequences that allow a user to control a program.

In some embodiments, user interface can be a mobile application software. Mobile application software, or an "app," is a computer program designed to run on smart phones, tablet computers, and any other mobile devices.

Module interface 106 can allow a user to register with and configure compensation engine 110 (discussed in more detail below) to enable a driver controlling a non-driverless vehicle to participate in a driverless vehicle priority system. It is contemplated that module interface 106 can allow a user to provide any information to compensation engine 110. For example, a user can input authentication, compensation parameters, and any other information that is used by compensation engine 110. As used herein, "compensation parameters" comprise any variables that can directly or indirectly control how a user participates in a vehicle priority system. For example, compensation parameters can include special designations associated with a user that affect the user's priority level (e.g., handicap status, first responder status, etc.).

Server computer 108 can be a standalone computing device, a management server, a web server, a mobile computing device, or any other computing system capable of receiving, sending, and processing data.

It is contemplated that server computer 108 can include a server computing system that utilizes multiple computers as a server system, such as, for example, a cloud computing system.

In other embodiments, server computer 108 can be a computer system utilizing clustered computers and components that act as a single pool of seamless resources when accessed within distributed data processing environment 100.

Figure 2:
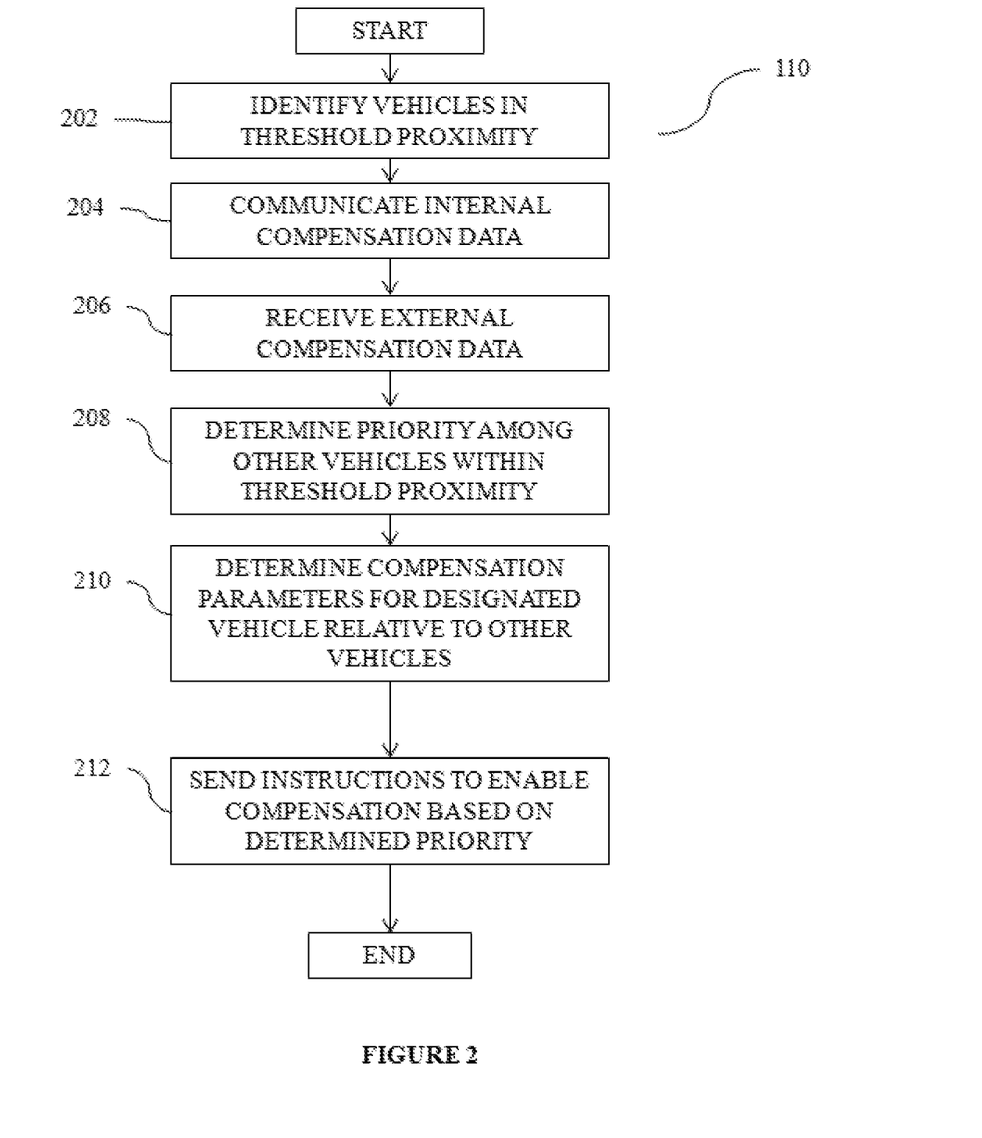
FIG. 2 is a schematic of a method of determining vehicle priorities, and parameters to enable compensation between vehicles in a network-connected vehicle system.
Figure 3:
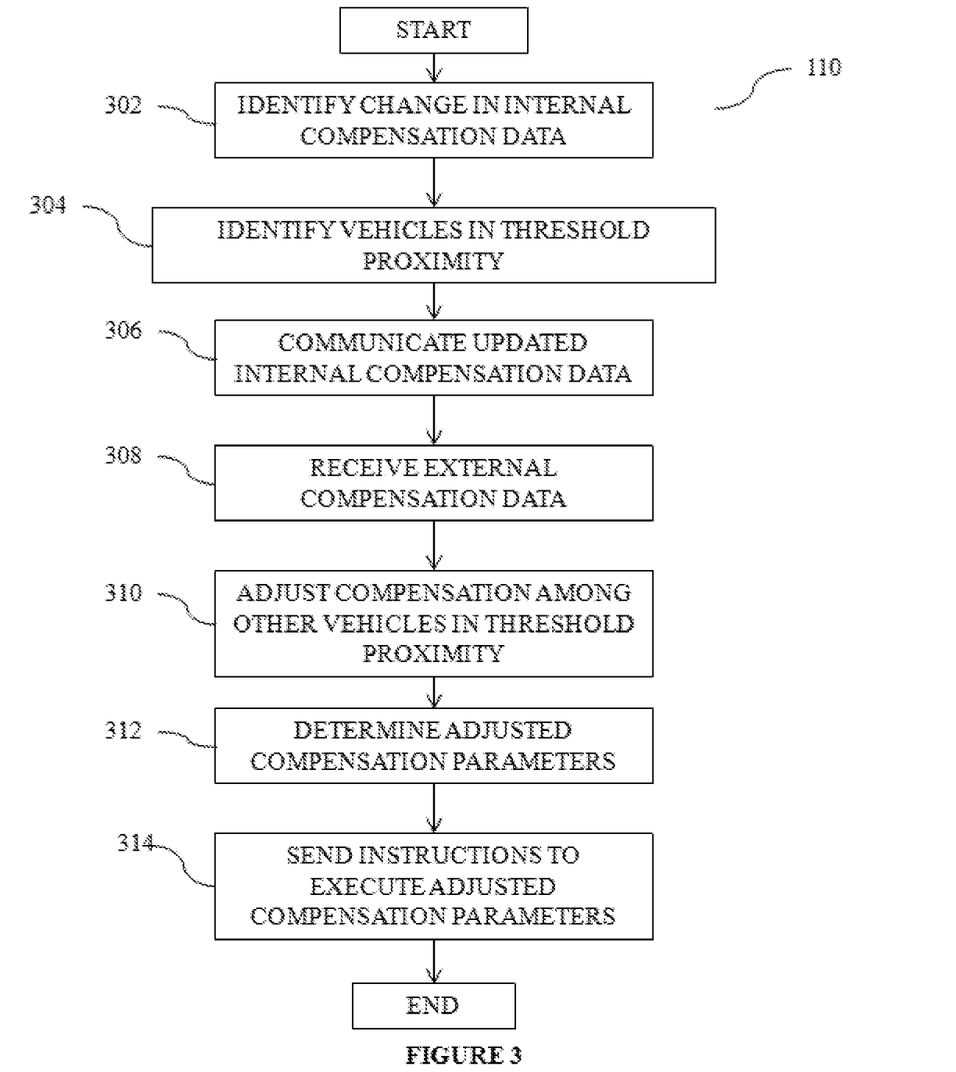
FIG. 3 is a schematic of a method of dynamically adjusting compensation parameters based on one or more changes in vehicles priorities.

Compensation engine 110 is depicted and described in more detail in FIG. 2 and FIG. 3.

Database 112 is a repository for data used by compensation engine 110. In the depicted embodiment, compensation engine 110 resides on server computer 108. However, database 112 can reside anywhere within a distributed data processing environment provided that compensation engine 110 has access to database 112.

Data storage can be implemented with any type of data storage device capable of storing data and configuration files that can be accessed and utilized by server computer 108.

Data storage devices can include, but are not limited to, database servers, hard disk drives, flash memory, and any combination thereof.

FIG. 2 is a schematic of a method determining vehicle priorities and determining compensation parameters to enable compensation between vehicles in a network-connected vehicle system.

Compensation engine 110 identifies one or more vehicles within a threshold proximity (step 202).

As defined herein, a vehicle refers to any mode of transportation. For example, vehicles can include automobiles, planes, boats, and trains. It is contemplated that vehicles can also include driverless vehicles, conventional vehicles, and any combination of driverless and conventional vehicles (e.g., a conventional vehicle guiding a group of self-driving vehicles).

The threshold proximity can be set at any distance away from one or more points. In some embodiments, the threshold proximity can be greater than the maximum distance between one vehicle and another. For example, the threshold proximity can be set to include every vehicle on earth. In preferable embodiments, the threshold proximity is set to a distance to include vehicles within a proximity that meaningfully affects the flow of traffic around a designated vehicle. For example, the threshold proximity can be set to a 2000 feet radius around a car.

It is also contemplated that the threshold proximity can additionally or alternatively include non-distance based variables. For example, the threshold proximity can include a designated geographical area, a common destination between multiple vehicles, and any other variable that allow compensation engine 110 to establish priorities among one or more vehicles or groups of vehicles.

Preferably, compensation engine 110 uses global positioning systems (GPS) to identify vehicles within a threshold proximity to a designated vehicle and/or geographical area. In some embodiments, the tracking is performed by an external entity. For example, compensation engine 110 can use satellite imaging to determine the positions of multiple vehicles and then communicate the information to one or more vehicles. It is contemplated that the aforementioned type of tracking is advantageous in environments where routes are not clearly established and/or where inter-vehicle communication is difficult, including, for example, undeveloped, mountainous regions.

It is further contemplated that compensation engine 110 can use any other spatial tracking system to determine the location of vehicles within a threshold proximity. For example, compensation engine 110 can use altitude data when determining routes and spatial positioning of airplanes. In another example, compensation engine 110 can use depth data when determining the spatial positioning of submarines.

In preferred embodiments, global positioning coordinates of multiple vehicles are gathered, consolidated, and used to identify vehicles within the threshold proximity. For example, global positioning coordinates of each vehicle in a city can be communicated to each other using conventional cellular data networks, gathered, and used to determine vehicles falling within a threshold proximity of a point of interest. It is also contemplated that any transmittable data can be communicated between vehicles, such as, for example, priority data and payment information.

In some embodiments, compensation engine 110 can identify vehicles based on parameters. For example, compensation engine 110 can isolate the commercial trucks within a threshold proximity rather than every category of vehicle when determining priority in weigh station for commercial vehicles.

Compensation engine 110 communicates internal compensation data (step 204).

Internal compensation data comprises any data associated with the compensation of a designated vehicle relative to any other factors. A designated vehicle can be, for example, a user's car, boat, plane, submarine, and/or bicycle. Factors can include other compensation data associated with other vehicles, time of day, geographic location, identification information, and any other variable associated with vehicles. It is contemplated that the designated vehicle serves as the basis for data gathered and calculations executed by compensation engine 110. For example, a user's car can serve as a geographical location that is used to determine which vehicles are in a threshold proximity to the user's vehicle.

Internal compensation data can be communicated through any communications medium known in the art. For example, compensation data, geographical location, type of vehicle, and speed can be communicated to from the designated vehicle to other vehicles through one or more wireless transmission mediums, including, for example, a cellular data network, satellite-based communication, and/or near field communications.

It is also contemplated that the vehicles are interconnected and receive data outside of their communications range by using a daisy-chain data transmission structure from vehicle to vehicle. For example, a vehicle can communicate and receive internal compensation data from a vehicle falling outside one-mile range limit of a near field communications device by sending or receiving internal compensation data between six cars that bridge a five-mile gap in increments of approximately one mile.

In some embodiments, one or more of the vehicles can be connected by proxy of other devices. For example, a smart phone connected by near field communications to the vehicle can handle intervehicle communication using a cellular data network.

It is contemplated that vehicles can communicate directly with each other and/or through a central communication hub (e.g., a third-party service).

Compensation engine 110 receives external compensation data (step 206).

External compensation data can comprise any data associated with factors outside of the designated vehicle. For example, external compensation data can comprise compensation data about every other vehicle within a threshold proximity of the designated vehicle. In another example, external compensation data can include information received from third party services, including, for example, GPS services and emergency notification services.

As with internal compensation data, external compensation data can be communicated through any communications medium known in the art. For example, compensation data, geographical location, type of vehicle, and speed can be communicated from other vehicles to the designated vehicle through one or more wireless transmission mediums, including, for example, a cellular data network, satellite-based communication, and/or near field communications.

Compensation engine 110 determines the priority of the designated vehicle among the other vehicles within the threshold proximity (step 208).

Compensation engine 110 can utilize any available information to determine the priority of the designated vehicle relative to the other vehicles falling within the threshold proximity. For example, information can comprise one or more of: (1) vehicle routes, (2) vehicle speeds, (3) vehicle classifications, (4) internal compensation data, (5) external compensation data, (6) environmental data, and (7) driver data.

It is contemplated that compensation engine 110 can use any type of analysis to determine the priority of one or more designated vehicles. For example, compensation engine 110 can use mathematical optimization techniques, including, for example, heuristics/metaheuristics, constraint satisfaction, space mapping, combinatorial optimization, non-linear programming, disjunctive programming, and multi-objective optimization. However, compensation engine 110 is not limited to any one or more optimization techniques, and can employ any optimization technique known in the art.

Compensation engine 110 determines compensation parameters for a designated vehicle based on the determined priority (step 210).

Compensation parameters comprise any parameters that control how each vehicle is either compensated or charged based on the relative priority of each vehicle. It is contemplated that compensation parameters can include any rules governing the transfer of compensation to and from vehicles. For example, compensation parameters can cause monetary payments to be received or paid in certain geographical areas and certain times. In another example, compensation parameters can determine time intervals at which money is paid and received. Specifically, compensation parameters can ensure that the priorities of the designated vehicle and the surrounding vehicles are updated to allow compensation engine 110 to update compensation data. Compensation can include monetary values, credits, time, distance, speed, and any other measurable variable that can be used as a currency.

In one example, compensation engine 110 can compensate drivers that choose lower priority status while charging drivers that choose a higher priority status. For example, compensation engine 110 can determine that vehicles that request the privilege of driving 10 miles per hour faster than the average speed of traffic will be charged one dollar for every mile traveled at the faster speed. On the other hand, compensation 110 can determine that vehicles choosing to drive at least 10 miles per hour slower than the average speed of traffic will be charged one dollar for every mile traveled at the slower speed.

In another example, compensation engine 110 can charge drivers that choose to arrive at their destination 15 minutes earlier than the average driver on their commute 15 minutes of time from the driver's account. For drivers that that choose to arrive at their destination 15 minutes later than the average driver on their commute, compensation engine can credit their accounts 15 minutes worth of time to be spent on one or more future commutes.

In yet another example, compensation engine 110 can compensate drivers that drive cars designated as environmentally friendly from money collected from drivers that drive cars that are designated as environmentally harmful. It is also contemplated that compensation engine 110 can compensate drivers based on their driving habits, such that drivers above a certain miles per gallon threshold earn credit and drivers that drive below the threshold lose credits.

In some embodiments, compensation engine 110 can facilitate direct transfers of compensation between or among two vehicles. For example, compensation engine 110 can execute the transfer of credits between a first vehicle and a second vehicle when the first vehicle sends a payment request to the second vehicle.

It is contemplated that transfers of compensation are preferably tied to the identities of at least one of the vehicle and the driver of the vehicle. For example, a commercial vehicle can be tied to the identity of the corporation that owns the vehicle. In another example, a non-commercial vehicle, such as a commuter vehicle, can be tied to an account of the driver that contains that driver's identification and payment information.

It is also contemplated that compensation engine 110 can dynamically reassess compensation data and determine compensation parameters based on changing variables, which is discussed in more detail in FIG. 3. For example, compensation engine 110 can determine new compensation parameters upon the presence of a vehicle within a threshold proximity of a designated vehicle that has paid for the highest level of priority (e.g., travel speeds, prioritized lanes, etc.). In another example, compensation engine 110 can receive a request from a vehicle in a lower priority group to upgrade to a higher priority group via a user interface. As a result, compensation engine 110 can change the compensation parameters to allow collection of funds from the vehicle and distribute it among vehicle that are in lower priority groups.

Compensation engine 110 sends instructions to execute the compensation parameters (step 212).

It is contemplated that compensation engine 110 can send instructions to notify a user regarding the compensation parameters and/or directly control one or more functions of the vehicles to comply with the determined compensation parameters.

For example, compensation engine 110 can send instructions to notify a user that access to a priority lane on the highway has been granted and instruct the user to make a payment for access to the priority lane. In another example, compensation engine 110 can send directly cause one or more program instructions to complete a financial or credit-based transaction. In a more specific example, compensation engine 110 can send program instruction for a computer to debit a user's account and transfer at least one form of compensation to a different entity.

FIG. 3 is a schematic of a method of dynamically adjusting compensation parameters based on one or more changes in vehicles priorities.

Compensation engine 110 identifies a change in internal compensation data (step 302).

It is contemplated that changes in compensation data correspond to one or more changes in priority data. For example, if a user changes their priority status by moving out of a prioritized lane, then compensation engine 110 can change the compensation data to move the user outside of a pricing tier associated with the prioritized lane.

Preferably, compensation engine 110 automatically detects one or more changes in the internal compensation data. For example, compensation engine 110 can automatically detect that a user has driven their vehicle outside of a higher speed lane and consequently make changes to the internal compensation data of the driver and/or the vehicle.

In some embodiments, compensation engine 110 receives changes in compensation data when a user decides to send the data. For example, compensation engine 110 can identify an input into a user interface requesting that a user's priority level be lowered. In response, compensation engine 110 can change the internal priority data to correspond to the updated priority level of the user.

Changes in internal compensation data can include, but are not limited to, situational changes, user-initiated changes, and vehicular changes. For example, a vehicle can lose priority if an ambulance having a higher priority status is travelling on the same route within a threshold proximity, which consequently causes changes the user's compensation data corresponding to the change in priority. In another example, the user may decide to deactivate a priority status by opting out of paying a fee. In yet another example, a vehicle can lose priority when compensation engine 110 detects a mechanical issue with the vehicle that prevents the vehicle from safely travelling on a highway, which causes compensation engine 110 to change the compensation data to reflect the operational status of the vehicle.

Compensation engine 110 identifies one or more vehicles within a threshold proximity (step 304).

As similarly discussed in step 102, compensation engine 110 preferably uses global positioning systems (GPS) to identify vehicles within a threshold proximity to a designated vehicle and/or geographical area. In some embodiments, the tracking is performed by an external entity. However, it is contemplated that compensation engine 110 can use any method of identifying vehicles within a threshold proximity known in the art.

In preferred embodiments, global positioning coordinates of multiple vehicles are gathered, consolidated, and used to identify vehicles within the threshold proximity. For example, global positioning coordinates of each vehicle in a city can be communicated to each other using conventional cellular data networks, gathered, and used to determine vehicles falling within a threshold proximity of a point of interest. It is also contemplated that any transmittable data can be communicated between vehicles, such as, for example, compensation data and payment information.

It is contemplated that compensation engine 110 uses the location of one or more designated vehicles to establish a center point and the outer boundaries of the threshold proximity. In embodiments where multiple vehicles are used to establish the center point, compensation engine 110 can select a center point that best represents the multiple vehicles. For example, compensation engine 110 can average the distances between three cars to determine a center point that falls in between each of the vehicles.

Compensation engine 110 communicates updated internal compensation data (step 306).

Internal compensation data can be communicated through any communications medium known in the art. For example, compensation data, geographical location, type of vehicle, and speed can be communicated to from the designated vehicle to other vehicles through one or more wireless transmission mediums, including, for example, a cellular data network, satellite-based communication, and/or near field communications.

It is also contemplated that the vehicles are interconnected and receive data outside of their communications range by using a daisy-chain data transmission structure, in which data is transmitted from vehicle to vehicle. For example, a vehicle can communicate and receive internal compensation data from a vehicle falling outside a one-mile range limit of a near field communications device, by sending or receiving internal compensation data between six cars that bridge a five-mile gap, in increments of approximately one mile.

Using a daisy-chain data transmission structure is especially advantageous in situations where conventional wireless communications mediums are impractical or not possible. The daisy-chain transmission structure is not limited to a linear progression. For example, the daisy chain transmission structure can resemble a web where data is transmitted between more than two vehicles at a time.

In some embodiments, one or more of the vehicles are connected by proxy of independent wireless devices. For example, a smart phone connected by near field communications to the vehicle can handle intervehicle communication using a cellular data network.

In yet other embodiments, each vehicle are connected to a third party service that manages compensatory transactions without requiring vehicles to communicate directly with each other. For example, compensation engine 110 can operate on a remote server that serves as an intermediate party through which compensation is received from vehicles and delivered to other vehicles.

Compensation engine 110 receives external compensation data (step 308).

As similarly discussed in step 106, external compensation data can be communicated through any communications medium known in the art. It is contemplated that the external compensation data can include all, part, or none of the external compensation data collected in a prior instance.

In a closed system, the external compensation data can comprise the data from the same group of vehicles. For example, compensation engine 110 can receive the external compensation data from maintenance vehicles for a closed business campus.

In a partially open system, the external compensation data can comprise data from a pre-designated group as well as a variable group of vehicles. For example, compensation engine 110 can receive the external compensation data from a non-variable group of maintenance vehicles and a variable group of customer vehicles driving on the business campus.

In an open system, the external compensation data can comprise data from a variable group of vehicles. For example, compensation engine 110 can receive the external compensation data from a highly-variable group of vehicles surrounding a designated vehicle on a public highway.

Compensation engine 110 adjusts the compensation of the designated vehicle among the other vehicles within the threshold proximity (step 310).

As discussed similarly in step 108, compensation engine 110 can utilize any available information to adjust the priority of the designated vehicle relative to the other vehicles falling within the threshold proximity.

It is also contemplated that compensation engine 110 can use any type of analysis to adjust the compensation of one or more designated vehicles. For example, compensation engine 110 can use one or more algorithms to weigh variables (e.g., speed, time, route, travel lane, fuel consumption, zero emissions status, and etc.) to determine how much compensation to either receive or send to a driver of a designated vehicle.

In another embodiment, compensation engine 110 uses passive determinations to determine how much compensation to either receive or send to a driver of a designated vehicle. For example, compensation engine 110 can look at select variables to make a dispositive determination of how much a driver either owes or is owed. If the driver uses a prioritized lane, then compensation engine 110 can use the predetermined rate of $1.00/mile to calculate how much the driver will owe once they exit the prioritized lane.

In some embodiments, compensation engine 110 uses a mixture of active and passive means of determining compensation for a designated vehicle/driver. For example, compensation engine 110 can use a straight scale for determining how much to charge for the use of priority lanes but use an algorithm to calculate how much to charge for faster travel speeds relative to other vehicles within a threshold proximity of the designated vehicle.

As used herein the term "determining compensation between the first and second vehicles" means determining the relative rights and priorities of each of a first and a second vehicle. Based on the determination of relative rights and priorities of each of the first and second vehicles, transfers of value are arranged between the first and second vehicles as compensation for ceding priority and/or payment for receiving priority. As used herein, value can include any transferable unit of compensation (e.g., time, speed, money, etc.) between two entities.

In yet other embodiments, compensation engine 110 uses artificial intelligence-based algorithms to dynamically determine compensation parameters. For example, compensation engine 110 can use one or more of a linear regression analysis, supervised learning classifiers, and time-series classifiers to determine how much to charge or send to a designated driver based on non-constant variables, including, for example, density of traffic based on highly variable parameters.

Highly variable parameters include any variables that indirectly cause changes in the movement of vehicles. For example, compensation engine 110 can use a time-series analysis to determine when and how the start of the school year in September will affect travel times on the highways. In a further related example, compensation engine 110 can also use a supervised learning classifier to determine whether determinations of travel times using a time-series analysis yields accurate results relative to real-world data. It is contemplated that compensation engine 110 can feed information learned through one or more analysis back into the compensation engine 110 to improve the accuracy of one or more types of predictive analyses in predicting real-world conditions.

Compensation engine 110 determines adjusted compensation parameters (step 312).

It is contemplated that compensation engine 110 can alter preexisting compensation parameters and create new compensation parameters depending on the situation. Where the situation within the threshold proximity remains substantially similar or the same, compensation engine 110 can make one or more adjustments to the previously determined compensation parameters. For example, compensation engine 110 can continue to charge vehicles that choose to travel 10 miles per hour faster than the average speed of traffic, the same rate if compensation engine 110 does not detect a change in the average speed of traffic, and the average speed of travel of the driver.

Additionally, compensation engine 110 can create new compensation parameters based on a change in the situation that requires a new compensation parameter. For example, compensation engine 110 can create a new compensation parameter that adds an extra surcharge of $10/hour when using a priority lane during traffic that exceeds a density threshold.

However, it is contemplated that compensation engine 110 can change any variable associated with the compensation of the designated vehicle in response to any changes in travel conditions.

Compensation engine 110 sends instructions to execute the adjusted compensation parameters (step 314).

Preferably, compensation engine 110 sends instruction to execute the adjusted compensation parameters wirelessly to a designated vehicle. For example, compensation engine 110 can use a conventional cellular data network, a wireless fidelity-based (WiFi™) network, a satellite transmission medium, and/or a radio transceiver-based system.

However, it is contemplated that compensation engine 110 can use any communications medium known in the art.

Figure 4:
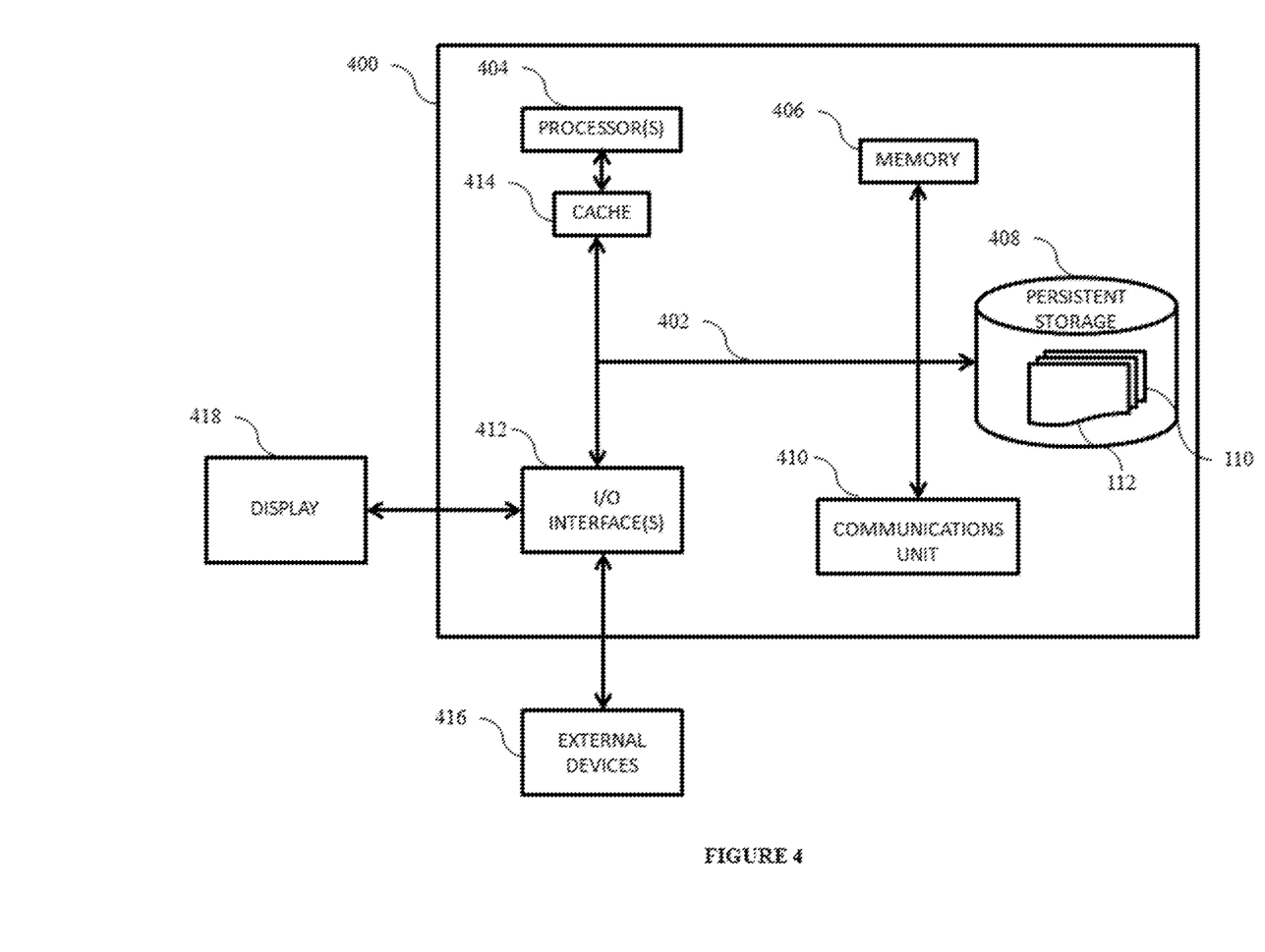
FIG. 4 depicts a block diagram of components of a server computer executing the compensation engine within the distributed data processing environment of FIG. 1.

FIG. 4 depicts a block diagram of components of computer system 400 executing the program instructions associated with compensation module 104 within the distributed data processing environment 100 of FIG. 1. FIG. 4 is not limited to the depicted embodiment. Any modification known in the art can be made to the depicted embodiment.

In one embodiment, the computer includes processor(s) 404, cache 414, memory 406, persistent storage 408, communications unit 410, input/output (I/O) interface(s) 412, and communications fabric 402.

Communications fabric 402 provides a communication medium between cache 414, memory 406, persistent storage 408, communications unit 410, and I/O interface 412. Communications fabric 402 can include any means of moving data and/or control information between computer processors, system memory, peripheral devices, and any other hardware components.

Memory 406 and persistent storage 408 are computer readable storage media. As depicted, memory 406 can include any volatile or non-volatile computer storage media. For example, volatile memory can include dynamic random access memory and/or static random access memory. In another example, non-volatile memory can include hard disk drives, solid state drives, semiconductor storage devices, a read-only memory (ROM), an erasable programmable read-only memory (EPROM), a flash memory, and any other storage medium that does not require a constant source of power to retain data.

In one embodiment, memory 406 and persistent storage 408 are random access memory and a hard drive hardwired to compensation module 104, respectively. For example, compensation module 104 can be a computer executing the program instructions of compensation engine 110 communicatively coupled to a solid state drive and DRAM.

In some embodiments, persistent storage 408 is removable. For example, persistent storage 308 can be a thumb drive or a card with embedded integrated circuits.

Communications unit 410 provides a medium for communicating with other data processing systems or devices, including data resources used by compensation module 104. Preferably, communications unit 410 comprises multiple network interface cards. However, it is contemplated that communications unit 410 can comprise physical and/or wireless communication links.

It is contemplated that compensation engine 110, database 112, and any other programs can be downloaded to persistent storage 408 using communications unit 410.

In a preferred embodiment, communications unit 410 comprises a global positioning satellite (GPS) device, a cellular data network communications device, and short to intermediate distance communications device (e.g., Bluetooth®, near-field communications, etc.). It is contemplated that communications unit 410 allows compensation module 104 to communicate with other compensation modules 104 associated with driverless and/or non-driverless cars in a vehicle priority system.

Display 418 is contemplated to provide a mechanism to display information from compensation engine 110 through compensation module 104. In preferred embodiments, display 318 can have additional functionalities. For example, display 418 can be a pressure-based touch screen or a capacitive touch screen.

In yet other embodiments, display 418 can be any combination of sensory output devices, such as, for example, a speaker that communicates information to a user and/or a vibration/haptic feedback mechanism. For example, display 418 can be a combination of a touchscreen in the dashboard of a car, a car speaker system, and a vibrating bracelet worn by a user to communicate information through a series of vibrations.

It is contemplated that display 418 does not need to be physically hardwired components and can, instead, be a collection of different devices that cooperatively communicate information to a user.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something designated from the group consisting of A, B, C . . . and N, the text should be interpreted as requiring only one element from the group, not A plus N, or B plus N, etc.

What is claimed is:

1. A method for managing compensatory transactions between first and second vehicles, comprising a centralized electronic computer system to automatically:

detecting, by the centralized electronic computer system, that the first vehicle is within a communication range of the centralized electronic computer system;

establishing a communications connection between the first and second vehicles, wherein the second vehicle is within a range of communication with the first vehicle and outside of the communications range of the centralized electronic computer system;

determining, by the centralized electronic computer system, relative priorities of the first and second vehicles;

determining, by the centralized electronic computer system, compensation between the first and second vehicles based on the relative priorities of the first and second vehicles;

executing a transfer of compensation between the first and second vehicles;

identifying a change in relative priorities of the first and second vehicles;

adjusting compensation in response to the change in relative priorities of the first and second vehicles; and executing a modified transfer of compensation between the first and second vehicles according to their modified relative priorities.

2. The method of claim 1, wherein the first set of compensation data comprises data used to determine one or more compensation parameters associated with the second vehicle.

3. The method of claim 2, wherein the second set of compensation data comprises data used to determine one or more compensation parameters associated with the first set of vehicles.

4. The method of claim 1, wherein the compensation comprises a quantifiable metric selected from the group consisting of: currency, credits, time, travel distance, travel position, and travel speed.

5. The method of claim 1, wherein the relative priorities of the first and second vehicles are determined by exchanging compensation data.

\* \* \* \* \*